3,450,787
Patented June 17, 1969

1

3,450,787
DEHYDROGENATION PROCESS
William L. Kehl and Raymond J. Rennard, Jr., Pittsburgh, Pa., assignors to Goodrich-Gulf Chemicals, Incorporated, Cleveland, Ohio, a corporation of Delaware
No Drawing. Filed May 21, 1968, Ser. No. 730,916
Int. Cl. C07c 5/18
U.S. Cl. 260—680                  22 Claims

ABSTRACT OF THE DISCLOSURE

Process for the oxidative dehydrogenation of hydrocarbons which comprises contacting a mixture of a hydrocarbon and oxygen with a magnesium chromium ferrite catalyst at a temperature above about 250° C., thereby producing a dehydrogenated hydrocarbon having the same number of carbon atoms as said hydrocarbon.

BACKGROUND OF THE INVENTION

Field of the invention

This invention relates to a process for dehydrogenating hydrocarbons. More particularly, this invention relates to the oxidative dehydrogenation of hydrocarbons in the presence of oxygen and a catalyst.

DESCRIPTION OF THE PRIOR ART

Oxidative dehydrogenation processes have been employed to convert saturated and/or unsaturated hydrocarbons to more highly unsaturated hydrocarbons through removal of hydrogen from such hydrocarbons by combination with oxygen to form water and the unsaturated product in the presence of a catalyst. Catalyst systems have heretofore been proposed to increase the selectivity of the process to produce the desired product and the conversion per pass of the feed stream thereby maximizing the yield per pass of the desired product. Many of these catalysts, however, have necessitated the use of relatively high reaction temperatures, e.g., above 600° C., and/or low pressures, generally between about 5 and 25 p.s.i.a. Recently, catalysts of the ferrite family have been proposed for use in oxidative dehydrogenation processes. These catalysts, however, are prepared at relatively high temperatures, i.e., about 850° C. to 1,300° C., and have been found to be stable for only relatively short periods of time at reaction conditions.

Accordingly, it is an object of the present invention to provide a catalyst system which when employed in oxidative dehydrogenation processes effects high conversion and selectivity to the desired product.

It is another object of the present invention to provide a more stable and hence longer lived catalyst system than heretofore employed in oxidative dehydrogenation processes.

It is still another object of the present invention to provide an oxidative dehydrogenation process employing relatively low reaction temperatures and being essentially free of pressure limitations.

SUMMARY OF THE INVENTION

In accordance with the present invention, a process is provided for the oxidative dehydrogenation of hydrocarbons comprising contacting a mixture of a hydrocarbon containing at least about 4 carbon atoms and oxygen with a magnesium chromium ferrite catalyst having the empirical formula $Mg_aCr_bFe_cO_4$ wherein $a$ ranges from about 0.1 to about 3, $b$ ranges from greater than 0 to less than 2 and $c$ ranges from greater than 0 to less than 3, at a temperature above about 250° C. thereby producing a dehydrogenated hydrocarbon having the same number of carbon atoms as said initial hydrocarbon.

DESCRIPTION OF THE INVENTION

The catalysts useful in the present invention are magnesium chromium ferrites containing, as the active components thereof, magnesium, chromium and iron cations in a single phase partially inverted spinel compound. Magnesium has a stronger octahedral site stabilization energy than the trivalent iron, and when these are combined in accordance with the present invention, the result is a partially inverted spinel in which a significant number of the magnesium cations tend to occupy octahedral sites and a corresponding number of iron cations are displaced into tetrahedral sites. The catalyst can be employed in the form of the homogeneous magnesium chromium ferrite, per se, or as a heterogeneous composition containing a mixture of the oxides of said cations and the single phase partially inverted spinel compound.

The catalyst employed in the present invention can be represented by the empirical formula $Mg_aCr_bFe_cO_4$ wherein $a$ can vary within the range of about 0.1 to about 3, $b$ can vary from greater than 0 to less than 2 and $c$ can vary from greater than 0 to less than 3. In a preferred form of the catalyst $a$ can vary within the range of about 0.1 to about 2.0, $b$ can vary from about 0.1 to about 1.8 and $c$ can vary from about 0.25 to about 1.9 while in a more preferred arrangement $a$ can vary from about 0.8 to about 1.3, $b$ can vary from about 0.2 to about 1.5 and $c$ can vary from about 0.5 to about 1.8. In the most preferred form of the catalyst $a$ is about 1.0.

In the homogeneous structure all of the elements are located in a single phase magnesium chromium ferrite compound. Since magnesium possesses a high octahedral site stabilization energy, a substantial amount of the magnesium will be in octahedral sites and a corresponding amount of iron will be in tetrahedral sites. Since localized irregularities and non-stoichiometric relationships will occur in the lattice of homogeneous magnesium chromium ferrite as actually prepared, $a$ is about 1.0 and the sum of $b+c$ is about 2.0.

In the heterogeneous composition, also represented by the empirical formula $Mg_aCr_bFe_cO_4$, there will be present the single phase magnesium chromium ferrite compound as well as one or more oxides (or combined oxides) of one or more of the constituent cations. For example, if in the empirical composition $a$ is about 3, the catalyst will contain a major amount of magnesium oxide and a minor amount of a magnesium chromium ferrite compound. In this instance the composition will possess catalytic activity due to the magnesium chromium ferrite compound with magnesium oxide serving essentially as an inert diluent. Chromium and iron oxides, if present, may not be inert, i.e. they will have some activity for the desired reaction but with lower selectivity to the desired reaction. The empirical composition $MgCrFeO_4$ can represent a homogeneous composition or it can be a heterogeneous mixture of a magnesium chromium ferrite and individual oxides.

The homogeneous material can only result when $a$ is 1.0 or about 1.0. When $a$ deviates significantly from 1.0, the material is heterogeneous.

The magnesium chromium ferrite catalysts of the present invention can be identified by their characteristic X-ray diffraction patterns illustrative of which is that for $MgCrFeO_4$ which consists of lines with the following "$d$" spacings and relative intensities—

| $d(A°)$: | $I/I°$ |
|---|---|
| 4.83 | 36 |
| 2.96 | 24 |
| 2.52 | 100 |
| 2.41 | 5 |
| 2.09 | 35 |
| 1.705 | 1 |
| 1.605 | 30 |
| 1.475 | 40 |

The relative intensities and the width or sharpness of the lines in the patterns from these compounds will vary with changes in the relative concentrations of the cations in the structure. Inhomogeneity in the catalyst compositions is manifested by additional or doubled lines in the pattern.

The magnesium chromium ferrites can be conveniently prepared by employing as starting materials salts of magnesium, chromium and iron, in which salts the metals are contained as cations. Any such salt of said metals is satisfactory, however, it is preferred to employ inorganic salts of the metals, such as, for example, nitrates, carbonates, acetates and halides. These salts containing the metals as cations are then admixed with a basic reactant in order to precipitate the precursor of the final product. It is necessary to maintain this addition mixture at a high pH—above about 8, and preferably above about 9. It is considered preferable to vigorously stir the metal salts in order to reduce any pH gradients through said addition mixture.

In order to prevent the inclusion in the precursor, and thus in the final product, of any contaminant it is essential that either a volatilizable base or a base containing no deleterious contaminants such as, for example, sodium, be employed. Any base which can be vaporized readily under the conditions used for drying and calcining can be employed, such as, for example, ammonium carbonate, ammonium bicarbonate and ammonium hydroxide. It is considered preferable, however, to employ an aqueous ammonia solution as the volatilizable base.

After precipitation, advantageously the precursor is washed, again at a pH above about 8, and preferably above about 9, and then dried and calcined. This drying and calcining can effectively be accomplished by any of the techniques well known in the art. Generally, drying can be accomplished at temperatures from about 100° C. to about 150° C. for a period of from about 4 to about 60 hours while calcining can be effected at temperatures ranging from about 350° C. to about 800° C. for a period of from about 2 to 16 hours.

It has been found that the catalysts of the present invention can be conveniently prepared by forming aqueous solutions of salts of the respective cations, magnesium, chromium and iron, preferably the nitrate salts thereof, and admixing said solutions with an aqueous ammonium hydroxide solution at a pH above about 8, preferably between a pH of from about 8.5 to about 8.9, thereby co-precipitating the hydroxides of the cations. The resulting precipitate can then be washed, filtered, dried and calcined to yield the finished bulk catalyst.

The catalyst can be employed with or without a filter or carrier material and can be pelletized or formed employing conventional techniques. Suitable carrier materials are, for example, rough granular aluminas, zirconias, granular silicon carbide and other similar inert materials. Supported catalysts can be prepared by thoroughly mixing the granular particles of the carrier material with a thick wet slurry of the washed mixture of combined precipitates prior to drying and calcining. The slurried mixture can thereafter be dried at about 120° C. and calcined at about 650° C. to provide granular particles of the supported catalyst.

The process of the present invention is useful in the dehydrogenation of hydrocarbons containing at least four carbon atoms. Preferably, aliphatic and aromatic hydrocarbons are employed such as, for example, monoolefins, cycloaliphatic hydrocarbons, aromatic hydrocarbons and mixtures thereof. Exemplary of such hydrocarbons are butene-1, cis-butene-2, trans-butene-2, 2-methyl butene-3, 2-methyl butene-1, 2-methyl butene-2, cyclohexene, 2-methyl pentene-1, 2-methyl pentene-2, normal amylenes, other isoamylenes, and the like and mixtures thereof. For example, the process of the present invention is useful in converting butene to butadiene-1,3. Still further, the process can be employed to convert normal amylenes to piperylene or isoamylenes to isoprene. Thus, it can be seen that the process of the present invention is, in general, useful in converting unsaturated hydrocarbons to hydrocarbons of greater unsaturation.

The feed streams can be mixed hydrocarbon streams such as refinery streams or effluents from thermal or catalytic cracking processes. These and other refinery by-product streams which contain normal hydrocarbons and/or ethylenically unsaturated hydrocarbons are useful feed stocks.

It has been found, for example, that a mixed feed stream containing butene and butane can result in butene conversions of greater than 50 mole percent with greater than 90 percent selectively to butadiene-1,3. It has been found that little or not butane was converted to water and carbon dioxide thereby leaving essentially intact the oxygen needed for the oxidative dehydrogenation of butene to butadiene. Thus, the process of the present invention can, as an embodiment thereof, be employed as a two-stage process wherein a first stage butane is non-oxidatively dehydrogenated to a butane-butene mixture over a suitable catalyst such as, for example, chromia on alumina, and the butene in the resulting mixed effluent stream is converted to butadiene-1,3, in accordance with the present invention, in a second stage.

Oxygen is fed to the reaction zone in an amount ranging from about 0.2 to about 2.5 moles of oxygen per mole of hydrocarbon to be dehydrogenated. Preferably, about 0.3 to about 1 mole of oxygen per mole of hydrocarbon is employed. In general, it has been found that as the amount of hydrocarbon being fed to the reaction zone is increased relative to the oxygen, the conversion decreases and, to a lesser degree, the selectivity increases, with the result that the yield of the desired product decreases as the oxygen to hydrocarbon ratio decreases. The oxygen can be fed to the reaction as pure oxygen, air, oxygen-enriched air, oxygen mixed with inert diluents and the like. The total amount of oxygen utilized can be introduced into the gaseous mixture entering the reaction zone or can be added in increments at different sections of the reaction zone.

The conversion of the feed stream can be increased by employing a series of reaction zones with provision to introduce additional oxygen between reaction zones. The points of introduction of the additional oxygen are established to insure that any unreacted hydrocarbon can react over an area of active catalyst after the supply of oxygen in the initial feed stream has been substantially exhausted. It is important, however, that the added oxygen be intimately admixed with the other gases and vapors in the reaction zone prior to exposure of the oxygen-enriched mixture to an area of active catalyst.

The hydrocarbon feed stream is preferably dehydrogenated in the presence of added steam; however, the use of steam is not essential and can be omitted. When employed, it is considered preferable that the reaction mixture contain a quantity of steam ranging from about 5 to about 30 moles of steam per mole of hydrocarbon to be dehydrogenated and most preferably from about 10 to about 20 moles of steam per mole of hydrocarbon. In addition to acting as a diluent in the process, the flow rate and inlet temperature of the steam can be regulated to vary the internal reaction temperature.

The dehydrogenation reaction proceeds at temperatures of at least about 250° C. Preferably, the reaction is conducted at temperatures between about 300° C. and about 500° C. although higher temperatures approaching 600° C. or higher can be employed if desired. It is considered advantageous to operate at the lower end of the temperature range, for example, from about 250° C. to about 350° C., since the amount of carbon dioxide produced at these temperatures is appreciably less than at higher temperatures.

The dehydrogenation reaction can be conducted at atmospheric pressure, superatmospheric pressure or subatmospheric pressure. The total pressure of the system will normally be about or in excess of atmospheric pressure but generally below 10 atmospheres to avoid the explosive limit of the feed stream. Generally the total pressure will range from about 0.7 to about 10 p.s.i.g. Preferably the total pressure will be in the range of about 0.7 to 5 p.s.i.g. Excellent results have been obtained at about atmospheric pressure.

The process of the present invention can be satisfactorily conducted over a wide range of flow rates. The optimum flow rate is dependent upon the reaction temperature, pressures, catalyst particle size and type of reactor employed, e.g., fluid bed or fixed bed. The gaseous hourly space velocity (GHSV) as used herein is the volume of the total hydrocarbon feed in the form of vapor calculated under standard conditions of temperature and pressure (25° C. and 760 mm. Hg) passed per hour per unit volume of catalyst. Generally, the GHSV will be between about 200 to about 6,000 with GHSV between about 450 and 2,000 considered most preferable.

The dehydrogenation reaction zone can be of the fixed bed or fluid bed type. Conventional reactors for the production of unsaturated hydrocarbons are satisfactory. The reactor can either be packed with particular catalyst, per se, or the catalyst can be deposited on a carrier or support medium as hereinabove described. Other methods can similarly be employed to introduce the catalyst into the reaction zone; for example, the reaction zone itself can be coated with the catalyst or the catalyst in the form of wires, mesh, shreds, tablets and the like can be packed within the reactor.

Although not essential, the catalysts employed in the present invention can be activated by oxidizing and reducing the catalysts in the folowing sequence: Catalyst is oxidized by passing a stream containing about one part oxygen to about four parts inert diluent such as steam, helium, nitrogen and the like, over the catalyst at temperatures between about 400° C. to 600° C., preferably about 500° C. for about 30 minutes. Thereafter, a feed stream comprised of steam, hydrocarbon and oxygen is passed over the catalyst in a gas volume ratio of about 10/1/1, respectively, although the amount of each component can be varied without adverse effect. The feed stream is passed over the catalyst at temperatures of about 300° C. to 500° C., preferably at 400° C., for about 30 minutes. Thereafter, the oxidation step is repeated as described above, followed by reaction with the feed stream described above having a gas volume ratio of about 30/3/1, respectively, although again this ratio can be varied without adverse effect. The oxidation step described hereinabove is again repeated and finally the catalyst is reduced through use of any reducing gas such as hydrogen, carbon monoxide or hydrocarbons. Most conveniently a hydrocarbon such as butene can be employed as the reducing agent particularly in instances wherein butene is the hydrocarbon to be dehydrogenated simply by stopping the flow of oxygen. Thus, reduction of the catalyst is accomplished by passing butene or other similar hydrocarbon reducing gas in an inert diluent such as steam, helium and the like over the catalyst at temperatures between about 400° C. to 600° C., preferably at about 500° C., for about 30 minutes. Thereafter, the active catalyst of the present invention is obtained, providing higher conversion and selectivity to the desired unsaturated hydrocarbon together with lower isomerization activity. This superior performance is maintained at temperatures as low as about 325° C. with the additional advantage that the amount of carbon dioxide produced is less at such low temperatures than at the higher temperatures.

EXAMPLES

The following examples are to further illustrate the present invention and should not be considered as imposing any limitations on the scope of the invention. Unless otherwise specified, all percentages and parts are by weight.

EXAMPLE 1

A magnesium chromium ferrite catalyst was prepared in the following manner: 76.8 gm. of $Mg(NO_3)_2 \cdot 6H_2O$, 121.2 gm. $Fe(NO_3)_3 \cdot 9H_2O$ and 120 gm. $Cr(NO_3)_3 \cdot 9H_2O$ were dissolved in 1,000 ml. of distilled water forming a mixed cation solution. 250 ml. concentrated $NH_4OH$ was added to 750 ml. of distilled water forming a base solution. The base solution was added to a vessel containing 1,000 ml. of distilled water until a pH of 8.0 was attained. Thereafter, the mixed cation solution and the base solution were simultaneously, slowly added to the vessel with vigorous stirring, adjusting the rate of addition of the base solution to maintain a pH of 8.5 to 9.0 in the vessel. The final pH was between 8.9 to 9.0. The time required for the simultaneous addition was about 30 minutes, and a volume of 720 ml. of the base solution was employed. The resulting precipitate was allowed to settle overnight, and the clear supernatant liquid was thereafter decanted. Additional water was added and the decantation procedure repeated until the precipitate had been washed with at least two or three complete changes of water. The washed precipitate was filtered, dried at 120° C. and calcined at 650° C. for 16 hours.

X-ray diffraction analysis of the calcined product indicated a single phase with a well-ordered partially inverted spinel structure corresponding to $MgCrFeO_4$.

4.1 gm. of $MgCrFeO_4$ prepared in the manner described above was admixed with an equal volume of silicon carbide and loaded into a reactor consisting of a 22″ x ¾″ stainless steel tube with a 22″ x 15 mm. Vycor liner. The reactor was heated by means of a 13″ Hevi-Duty tube furnace and the furnace temperature was controlled by Thermo Electronic Temperature regulators. Temperatures within the catalyst bed were determined by means of a 1⁄16″ concentric stainless steel thermocouple will running the length of the reactor. The void space above and below the catalyst bed was filled with coarse particles of silicon carbide. The first 5″ of the reactor were used to preheat the inlet gases to reaction temperatures.

The catalyst was activated by oxidizing the catalyst with a 1.5/1 mixture of helium and oxygen for 30 minutes at 500° C. at a total GHSV of 1,500 hr.$^{-1}$. The catalyst was further conditioned by reaction at 400° C. with a feed stream consisting of a 10/1/1 mixture based on a gas volume of steam, butene-2 and oxygen. The reaction was carried out for 30 minutes at a total GHSV of 5,500 hr.$^{-1}$. After the reaction, the catalyst was reoxidized as described above and thereafter the reaction was continued at 400° C. with a 30/3/1 mixture based on gas volume of steam, butene-2 and oxygen. The reaction was conducted for 30 minutes at a total GHSV of 4,200 hr.$^{-1}$. The catalyst was again oxidized as described above and then reduced at 500° C. with a 10/1 mixture of helium and butene-2 for 30 minutes at a total GHSV of 5,000 hr.$^{-1}$. Although the oxidation and reduction steps described herein have been conducted with helium as the inert diluent nitrogen, steam, or any other similar inert diluent can likewise be employed.

The results obtained with the catalyst prior to activation and after activation are summarized in Table 1 below.

TABLE 1.—PRIOR TO ACTIVATION

| T. (° C.) | Feed Stream | | | Conversion (Mole Percent) | $C_4H_6$ (Mole Percent) | $CO_2$ (Mole Percent) | Yield of Butadiene (Mole Percent) |
|---|---|---|---|---|---|---|---|
| | $O_2/C_4$ | Steam/ Butene | GHSV (Butene) | | | | |
| 400 | 1 | 10 | 450 | 54 | 72 | 28 | 39 |
| 400 | 0.33 | 10 | 450 | 19 | 72 | 28 | 14 |
| AFTER ACTIVATION | | | | | | | |
| 350 | 1 | 10 | 450 | 77 | 80 | 20 | 61 |
| 400 | 1 | 10 | 450 | 79 | 82 | 18 | 65 |
| 400 | 0.5 | 10 | 450 | 51 | 90 | 10 | 46 |
| 350 | 1 | 10 | 450 | 76 | 86 | 14 | 65 |
| 350 | 0.67 | 10 | 450 | 64 | 90 | 10 | 58 |
| 325 | 1 | 10 | 450 | 82 | 84 | 16 | 69 |
| 325 | 0.67 | 10 | 450 | 61 | 90 | 10 | 55 |
| 325 | 1 | 20 | 450 | 80 | 86 | 14 | 69 |
| 325 | 0.67 | 20 | 450 | 41 | 92 | 8 | 38 |
| 325 | 0.67 | 14 | 675 | 65 | 90 | 10 | 58 |
| 325 | 0.67 | 10 | 900 | 76 | 91 | 9 | 69 |
| 325 | 0.67 | 8 | 1,125 | 75 | 88 | 12 | 66 |
| 325 | 0.67 | 7 | 1,350 | 70 | 88 | 12 | 62 |
| 325 | 0.67 | 17 | 1,350 | 71 | 90 | 10 | 64 |
| 400 | 1 | 10 | 450 | 78 | 82 | 18 | 64 |

EXAMPLE 2

To further illustrate the superior performance of the magnesium chromium ferrite compositions employed in the present invention, the oxidative dehydrogenation process as described herein was conducted employing different magnesium chromium ferrite compositions and, for comparative purposes, oxides of the cations employed in the present invention. Table 2 shown below summarizes the results obtained employing the catalysts of the present invention and magnesium ferrite, magnesium chromite, iron chromite and ferric oxide.

TABLE 2

| Catalyst Composition | T. (° C.) | $O_2/C_4H_8$ | Conversion (Mole Percent) | $C_4H_6$ (Mole Percent) | $CO_2$ (Mole Percent) | Yield $C_4H_6$ (Mole Percent) |
|---|---|---|---|---|---|---|
| MgCrFeO$_4$ | 400 | 1 | 79 | 82 | 18 | 65 |
| | 400 | 0.5 | 51 | 90 | 10 | 46 |
| | 325 | 0.67 | 64 | 90 | 10 | 58 |
| MgCr$_{0.5}$Fe$_{1.5}$O$_4$ | 400 | 1 | 67 | 85 | 15 | 57 |
| | 400 | 0.5 | 38 | 86 | 14 | 33 |
| | 325 | 0.67 | 44 | 85 | 15 | 37 |
| MgFe$_2$O$_4$ | 400 | 1 | 46 | 84 | 16 | 37 |
| | 400 | 0.5 | 26 | 90 | 10 | 24 |
| | 325 | 0.67 | 7 | 93 | 7 | 6 |
| MgCr$_2$O$_4$ | 400 | 1 | 29 | 38 | 62 | 11 |
| | 400 | 0.5 | 16 | 42 | 58 | 7 |
| FeCrO$_3$ | 400 | 1 | 41 | 62 | 38 | 25 |
| | 400 | 0.33 | 26 | 85 | 15 | 22 |
| | 400 | 1 | 55 | 76 | 24 | 42 |
| | 400 | 0.50 | 36 | 85 | 15 | 31 |
| | 400 | 0.33 | 30 | 87 | 13 | 26 |
| Fe$_2$O$_3$ | 400 | 1 | 34 | 55 | 45 | 19 |
| | 400 | 9.33 | 12 | 61 | 39 | 7 |
| | 400 | 1 | 31 | 56 | 44 | 17 |
| | 400 | 0.50 | 19 | 57 | 43 | 11 |
| | 400 | 0.33 | 12 | 52 | 48 | 6 |

EXAMPLE 3

The following example illustrates the effect of the conjoint use of n-butane in the oxidative dehydrogenation of butene-2 to butadiene employing the magnesium chromium ferrite catalyst of the present invention. The process employed was substantially similar to that described in Example 1, except that the feed stream contained a combined butane-butene stream. The results obtained are summarized in Table 3 below.

What is claimed is:

1. Process for the oxidative dehydrogenation of hydrocarbons comprising contacting at least one hydrocarbon containing at least about 4 carbon atoms and oxygen with a magnesium chromium ferrite catalyst having the empirical formula $Mg_aCr_bFe_cO_4$ wherein $a$ ranges from about 0.1 to about 3, $b$ ranges from greater than 0 to less than 2 and $c$ ranges from greater than 0 to less than 3, at a temperature above about 250° C. thereby producing a dehydrogenated hydrocarbon having the same number of carbon atoms as said initial hydrocarbon.

2. Process as defined in claim 1 wherein the magnesium chromium ferrite catalyst has the empirical formula $Mg_aCr_bFe_cO_4$ wherein $a$ ranges from about 0.1 to about 2, $b$ ranges from about 0.1 to about 1.8 and $c$ ranges from about 0.25 to about 1.9.

3. Process for the oxidative dehydrogenation of hydrocarbons comprising contacting at least one hydrocarbon containing at least 4 carbon atoms and from about 0.2 to about 2.5 moles of oxygen per mole of said hydrocarbon with a magnesium chromium ferrite catalyst having the empirical formula $Mg_aCr_bFe_cO_4$ wherein $a$ ranges from about 0.1 to about 2, $b$ ranges from about 0.1 to about 1.8 and $c$ ranges from about 0.25 to about 1.9, at a temperature above about 250° C., thereby producing a dehydrogenated hydrocarbon having the same number of carbon atoms as said initial hydrocarbon.

TABLE 3.—EFFECT OF n-BUTANE ON THE OXIDATIVE DEHYDROGENATION OF BUTENE TO BUTADIENE

| Catalyst Composition | T. (° C.) | Butane/ Butene | Oxygen/ Butene | Conversion (Mole Percent) | Selectivity to $C_4H_6$ (Mole Percent) | $CO_2$ (Mole Percent) | Yield $C_4H_6$ (Mole Percent) |
|---|---|---|---|---|---|---|---|
| MgCr$_{0.5}$Fe$_{1.5}$O$_4$ | 400 | 0 | 1 | 66 | 81 | 19 | 53 |
| | 400 | 3 | 1 | 69 | 82 | 18 | 56 |
| | 400 | 6.7 | 1 | 68 | 84 | 16 | 57 |
| | 350 | 6.7 | 0.67 | 57 | 91 | 9 | 52 |
| | 325 | 0 | 0.67 | 54 | 85 | 15 | 46 |
| | 325 | 1 | 0.67 | 53 | 90 | 10 | 48 |
| | 325 | 3 | 0.67 | 23 | 92 | 8 | 21 |
| | 325 | 6.7 | 0.67 | 15 | 94 | 6 | 14 |
| | 325 | ª 0 | 0.67 | 53 | 90 | 10 | 48 |

ª Steam/$C_4H_8$=13.5/1.

4. Process as defined in claim 3 wherein the mixture additionally contains from about 5 to 30 moles of steam per mole of hydrocarbon.

5. Process as defined in claim 3 wherein the oxidative dehydrogenation is conducted at temperatures of from about 300° C. to about 500° C.

6. Process as defined in claim 3 wherein the magnesium chromium ferrite catalyst has the empirical formula $Mg_aCr_bFe_cO_4$ wherein $a$ ranges from about 0.8 to about 1.3, $b$ ranges from about 0.2 to about 1.5 and $c$ ranges from about 0.5 to about 1.8.

7. Process for the oxidative dehydrogenation of hydrocarbons which comprises contacting at least one hydrocarbon containing at least 4 carbon atoms, from about 0.2 to about 2.5 moles of oxygen per mole of hydrocarbon and from about 5 to about 30 moles of steam per mole of hydrocarbn with an activated magnesium chromium ferrite catalyst having the empirical formula $Mg_aCr_bFe_cO_4$ wherein $a$ ranges from about 0.1 to about 3, $b$ ranges from greater than 0 to less than 2 and $c$ ranges from greater than 0 to less than 3, at temperatures above about 250° C., thereby producing a dehydrogenated hydrocarbon having the same number of carbon atoms as said initial hydrocarbon.

8. Process as defined in claim 7 wherein the hydrocarbon is butene.

9. Process as defined in claim 7 wherein the hydrocarbon stream comprises a mixture of butene and butane.

10. Process as defined in claim 7 wherein the hydrocarbon is an isoamylene.

11. Process as defined in claim 7 wherein the mixture contains from about 0.3 to about 1 mole of oxygen per mole of hydrocarbon.

12. Process as defined in claim 7 wherein the mixture contains from about 10 to about 20 moles of steam per mole of hydrocarbon.

13. Process as defined in claim 7 wherein the oxidative dehydrogenation is conducted at temperatures of from about 300° C. to about 500° C.

14. Process as defined in claim 7 wherein the magnesium chromium ferrite catalyst has the empirical formula $MgCr_bFe_cO_4$ wherein $b+c=$ about 2.

15. Process as defined in claim 7 wherein the magnesium chromium ferrite catalyst has the empirical formula $MgCrFeO_4$.

16. Process for the oxidative dehydrogenation of hydrocarbons comprising:
(a) contacting a magnesium chromium ferrite catalyst having the empirical formula $Mg_aCr_bFe_cO_4$ wherein $a$ ranges from about 0.1 to about 3, $b$ ranges from greater than 0 to less than 2 and $c$ ranges from greater than 0 to less than 3, with an oxidizing stream comprising oxygen and an inert diluent at temperatures of from about 400° C. to about 600° C. for a period of time sufficient to oxidize said catalyst;
(b) passing a feed stream of steam, hydrocarbon and oxygen over the catalyst at temperatures of from about 300° C. to about 500° C. for at least about 30 minutes;
(c) reoxidizing the catalyst as in (a);
(d) passing a feed stream over the catalyst as in (b);
(e) reoxidizing the catalyst as in (a);
(f) reducing the catalyst by passing a reducing stream over the catalyst comprising a reducing gas and an inert diluent at a temperature of from about 400° C. to about 600° C. for at least about 30 minutes; and thereafter,
(g) contacting at least one hydrocarbon containing at least 4 carbon atoms and from about 0.2 to 2.5 moles of oxygen per mole of hydrocarbon with said activated magnesium chromium ferrite catalyst at a temperature above about 200° C., thereby producing a dehydrogenated hydrocarbon having the same number of carbon atoms as said initial hydrocarbon.

17. Process as defined in claim 16 wherein the reactant mixture additionally contains from about 5 to about 30 moles of steam per mole of hydrocarbon.

18. Process as defined in claim 16 wherein the magnesium chromium ferrite catalyst has the empirical formula $Mg_aCr_bFe_cO_4$ wherein $a$ ranges from about 0.1 to about 2, $b$ ranges from about 0.1 to about 1.8 and $c$ ranges from about 0.25 to about 1.9.

19. Process as defined in claim 16 wherein the hydrocarbon is butene.

20. Process as defined in claim 16 wherein the hydrocarbon stream comprises a mixture of butene and butane.

21. Process as defined in claim 16 wherein the hydrocarbon is an isoamylene.

22. Process as defined in claim 16 wherein the reducing gas is butene.

References Cited

UNITED STATES PATENTS 3,284,536  11/1966  Bajars et al. _____ 260—680

PAUL M. COUGHLAN, JR., *Primary Examiner.*

U.S. Cl. X.R.

252—468

Notice of Adverse Decision in Interference

In Interference No. 97,358 involving Patent No. 3,450,787, W. L. Kehl and R. J. Rennard, Jr., DEHYDROGENATION PROCESS, final judgment adverse to the patentees was rendered Oct. 7, 1974, as to claims 1, 3, 5, 7, 8 and 10–13.

[*Official Gazette February 18, 1975.*]